(12) United States Patent
Kitney et al.

(10) Patent No.: US 10,133,976 B2
(45) Date of Patent: Nov. 20, 2018

(54) SUBSTRATE

(71) Applicant: Polar OLED Ltd, Leeds (GB)

(72) Inventors: Stuart Kitney, Leeds (GB); Dai Hayward, Leeds (GB)

(73) Assignee: Polar OLED Ltd, Leeds (GB)

(*) Notice: Subject to any disclaimer, the term of this patent is extended or adjusted under 35 U.S.C. 154(b) by 0 days.

(21) Appl. No.: 15/590,701

(22) Filed: May 9, 2017

(65) Prior Publication Data

US 2017/0323193 A1 Nov. 9, 2017

(30) Foreign Application Priority Data

May 9, 2016 (GB) .................................. 1608070.7

(51) Int. Cl.
*G06K 19/077* (2006.01)
*G06K 19/07* (2006.01)

(52) U.S. Cl.
CPC ... *G06K 19/07722* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 9,577,198 B1* | 2/2017 | Zheng | H01L 51/0058 |
| 2013/0169697 A1* | 7/2013 | Park | G09G 3/2003 345/690 |
| 2013/0299592 A1* | 11/2013 | Chiang | G06K 19/07309 235/492 |
| 2016/0055802 A1* | 2/2016 | Ahn | H04N 13/0486 345/691 |
| 2017/0092863 A1* | 3/2017 | Bower | H01L 51/0013 |

* cited by examiner

*Primary Examiner* — Kristy A Haupt
(74) *Attorney, Agent, or Firm* — Mark H. Whittenberger; Holland & Knight LLP

(57) ABSTRACT

A substrate for contactless transaction card, which is equipped with an integrated chip (IC) connected to at least one organic light-emitting diode (OLED) and an inductively powered tag.

16 Claims, 2 Drawing Sheets

SUBSTRATE

RELATED APPLICATION

The subject application claims the priority of GB 1608070.7, filed on May 9, 2016, the contents of which are herein incorporated by reference in its entirety.

FIELD OF THE INVENTION

The present disclosure relates to a substrate. In particular, but not exclusively, the disclosure relates to a contactless transaction card comprising such a substrate. The disclosure also extends to a method of manufacturing such a substrate.

BACKGROUND

Contactless payment systems, such as contactless credit or debit cards or Apple Pay devices use radio frequency identification (RFID) or near field communication (NFC) for making secure payments.

Since no signature or PIN (personal identification number) is required, contactless payment systems are considered to be much quicker than conventional payment systems. Indeed, according to the UK Card association 2015 saw an increase of 331% in contactless payments on cards. Figures published in 2015 by The UK Cards Association revealed a surge in contactless payments in 2014. Total spending trebled last year to £2.32 billion, spread across 319 million transactions.

The launch of contactless payments on Transport for London services in September 2014 had a major impact, with over one in ten (11 percent) of all contactless transactions in December 2014 made on London Transport. From September 2015, the limit on contactless transactions increased from £20 to £30, opening up new retail sectors to contactless payments.

Some contactless systems, like Apple Pay, that work via a smart phone or the like, provide confirmation to a user that a transaction has been completed by vibrating or beeping. However, when using a conventional plastic contactless payment card the user receives no feedback on whether the transaction has been completed.

The present invention has been devised to mitigate or overcome at least some of the above-mentioned problems.

SUMMARY OF THE INVENTION

According to an embodiment of the present invention, there is provided a substrate for a contactless transaction card, which is equipped with an integrated chip (IC) connected to at least one organic light-emitting diode (OLED) and an inductively powered tag.

Advantageously, OLEDs are much thinner, lighter and cheaper than conventional LEDs and can, therefore, be incorporated within the body of a thin substrate without affecting its physical dimensions. The OLED may be configured to provide visual feedback to a user of the card, for example confirming the completion of a transaction.

The substrate may be substantially flexible.

The inductively powered tag may provide a wireless network connection with an external device, when in use.

The wireless network connection may be operable over at least one of the following frequency ranges: a low frequency range of about 120 to about 150 KHz, a high frequency range of about 3 to about 30 MHz, and an ultra-high frequency range of about 300 MHz to about 3 GHz.

The at least one OLED may be configured to be activated in dependence on the wireless network connection.

The at least one OLED may be activated by drawing current from the inductively powered tag.

The at least one OLED may be configured to flash in coordination with an alternating current that it receives from the inductively powered tag.

The at least one OLED may be configured to output light with at least one of the following characteristics: a brightness of about 350 cd/m2, and a spectral output peak maximum of about 565 nm.

The integrated chip may be configured to supply the at least one OLED with a direct current which is inverted from an alternative current that is drawn from the inductively powered tag.

The at least one OLED may be configured to output light with a brightness of about 250 cd/m2.

The at least one OLED may be configured to display a two dimensional image.

Two or more OLEDs may be arranged in an array to define an OLED display configured to display the two dimensional image.

Two or more OLEDs may be patterned into the tag through diffusion in the outer plastic casing of the substrate to form the two dimensional image.

An additional power source may be provided within the substrate to power the tag and/or the at least one OLED.

According to a further aspect of the invention there is provided a contactless transaction card comprising the substrate of any preceding paragraph.

According to a further aspect of the invention there is provided a method of manufacturing a substrate for a contactless transaction card, the method comprising depositing an integrated chip (IC), at least one organic light-emitting diode (OLED) and an inductively powered tag onto the substrate; wherein the IC is connected to the at least one OLED and the inductively powered tag.

The inductively powered tag and the at least one OLED may be deposited together in a single fabrication process.

The inductively powered tag and the at least one OLED may be deposited separately and/or sequentially.

The method may comprise printing the inductively powered tag from any suitable solution without using thermal deposition or metal wiring.

Depositing at least one of the inductively powered tag and the at least one OLED may comprise using one or more of ink-jet flex printing, slot-die coating, screen printing, ink-jet printing, gravure printing, blade coating and spin coating.

According to an aspect of the invention there is provided a substrate which is equipped with an integrated chip (IC) connected to at least one organic light-emitting diode (OLED) and an RFID tag or an NFC tag.

In one aspect of the invention the substrate may be a flexible substrate, such as a plastics material, for example, a plastics material suitable for use in a contactless transaction card. When the substrate is flexible, it is desirable that the OLED is also flexible. However, it will be understood that a rigid substrate may also be suitable for use in the present invention.

Thus, according to a further aspect of the invention there is provided a contactless transaction card which is equipped with an integrated chip (IC) connected to at least one flexible organic light-emitting diode (OLED) and an RFID tag or an NFC tag.

It will be understood by the person skilled in the art that a variety of known flexible organic light-emitting diodes (OLEDs) may be utilised in the present invention. By way of example, only, such OLEDs are described in U.S. Pat. No. 6,867,243, U.S. Pat. No. 7,265,163, U.S. Pat. No. 7,166,239, U.S. Pat. No. 7,199,167, U.S. Pat. No. 7,081,307, U.S. Pat. No. 6,830,831 and WO 2012/098410.

In one aspect of the invention the tag is an RFID tag. In another aspect of the invention the tag is an NFC tag.

In use, the OLED present on the substrate is activated as a light source or display to confirm an RFID or NFC connection. Advantageously, the RIFD or NFC tag will be used for passive activation, not requiring the use of a power source within the tag or the substrate.

Advantageously, due to the low power consumption of the OLED, the RFID or NFC signal will provide sufficient energy to power the OLED.

The RFID or NFC tags may cover a variety of ranges. Thus, the RFID or NFC tags will generally cover a low frequency signal range, for example, from about 120 to about 150 KHz; a high frequency, for example, from about 3 to about 30 MHz; and/or an ultra-high frequency, for example, from about 300 MHz to about 3 GHz, as new tracking applications are being sought for UHF.

An image may be patterned into the RFID/NFC tag through diffusion in the outer plastic casing of the substrate or alternatively, the OLED itself can act as the display to generate a contact confirmation image.

The term contactless transaction card shall include, but shall not be limited to, bank cards for contactless payments, e.g. debit or credit cards; e-tickets; access cards; key-fobs; wristbands; security labels; travel documents and other conventionally known applications utilising NFC.

In addition to conventionally known contactless card applications, the RFID or NFC tag may also have applications in product tracking, such as, in the food supply chain; healthcare applications; and advertising, for example, when the tag is in close proximity a user specific or product specific advertisement may be triggered. For tracking applications described herein the RFID or NFC tag may be used as an active RFID or NFC tag, which may require the addition of a power source within the tag.

According to a further aspect of the invention there is provided a method of manufacturing a substrate equipped with an integrated chip (IC) connected to at least one organic light-emitting diode (OLED) and an RFID tag or an NFC tag, as described herein, wherein said method comprises printing or evaporating the integrated chip (IC); the at least one organic light-emitting diode (OLED); and an RFID tag or an NFC tag onto the substrate.

In one aspect the method comprises printing the integrated chip (IC); the at least one organic light-emitting diode (OLED); and an RFID tag or an NFC tag onto the substrate. In another aspect the method comprises evaporating the integrated chip (IC); the at least one organic light-emitting diode (OLED); and an RFID tag or an NFC tag onto the substrate.

This aspect of the invention especially provides a method of manufacturing a flexible substrate, such as a plastics material, for example, a plastics material, including at least one flexible OLED.

Thus, the method of the invention especially provides a method of manufacturing a contactless transaction card as described herein.

In the method of the invention the RFID or NFC tag can be printed using any RFID/NFC suitable ink and requires no thermal deposition or use of metal wire. This is then combined with a printed OLED in a single fabrication process, including but not exclusively, a sheet-fed or a roll-to-roll process. The IC; RFID or NFC tag; and the OLED light source or OLED display are printed or evaporated separately, simultaneously or sequentially. The method of the invention may also include a pick and place procedure.

When the method of the invention includes printing, the printing techniques used to fabricate the RFID/NFC tags and associated OLED display or light source will include, but not limited to, one or more of ink-jet flex printing, slot-die coating, screen printing, ink-jet printing, gravure printing, blade coating techniques and spin coating.

When the method of the invention comprises the manufacture of a transaction card as herein described, the method may also include a step of laminating the flexible substrate or card.

According to a further aspect of the invention there is provided a method of conducting a contactless transaction with a transaction card: wherein an RFID or NFC antenna in a card reader transmits a transaction signal to a contactless card as herein described; said transaction signal reads the RFID/OLED chip or NFC/OLED chip in the card; triggering said transaction.

Currently, contactless transactions are not encrypted, therefore, no security issue are envisaged when the RFID or NFC signal confirms that a transaction has been completed.

According to a further aspect of the invention there is provided the use of an OLED in the manufacture of a contactless transaction card as herein described.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF EMBODIMENTS

A specific embodiment of the invention will now be described in which numerous specific features will be discussed in detail to provide a thorough understanding of the inventive concept as defined in the claims. However, it will be apparent to the skilled person that the invention may be put into effect without these specific details and that, in some instances, well known methods, techniques and structures have not been described in detail in order not to obscure the invention unnecessarily.

Figure 1:
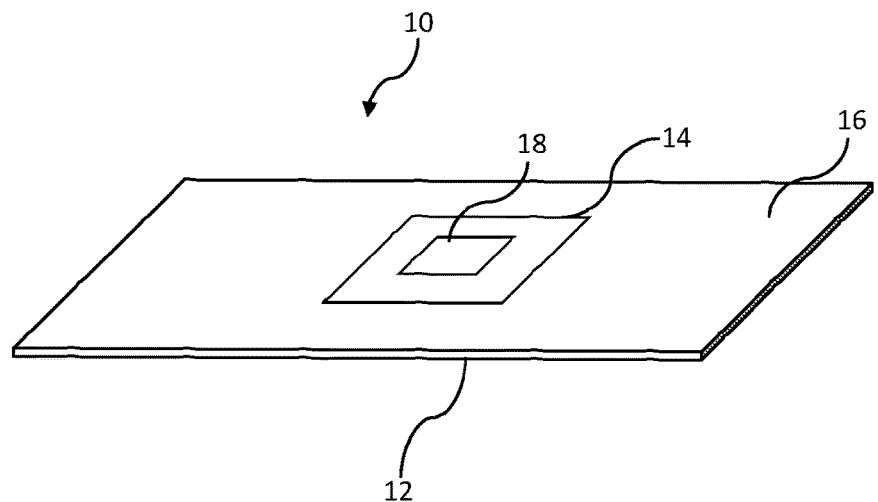
FIG. 1 is a perspective view of a contactless transaction card comprising an OLED according to an embodiment of the invention.

To place the embodiments of the invention in a suitable context, reference will firstly be made to FIG. 1, which illustrates a perspective view of a contactless transaction card. The transaction card may be a bank card used for contactless payments such as, for example, a debit or credit card.

The transaction card 10 comprises a substrate 12 which is provided with a transaction module 14 that is mounted to an upper face 16 of the substrate 12. The transaction module 14 comprises an integrated chip, which is connected to an organic light emitting diode (OLED) 18 and an inductively powered tag (not shown). The transaction module 14 is configured so that the inductively powered tag provides a wireless network connection with an external device, when in use, and the OLED is configured to be activated in dependence on the wireless network connection.

Preferably, the substrate conforms with the ISO/IEC 7810 ID-1 standard. The substrate 12 has a rectangular upper face that measures 85.60 mm long and 53.98 mm wide and with a thickness of 0.8 mm. It is formed from a non-conductive and substantially flexible polymer material such as polyvinylchloride acetate (PVCA). For full conformity with the standard, the substrate 12 may have rounded corners with a radius of 2.88-3.48 mm.

The components of the transaction module 14 are housed within the body of the substrate 12 such that they do not protrude beyond any external face of the substrate 12. The transaction module 14 is shown in FIG. 1 as being arranged in a central position on the upper face 16 of the substrate 12. In alternative embodiments the transaction module 14 may be arranged in any number of positions on the upper surface 16 of the substrate 12 such that the OLED 18 is visible on any exterior face of the substrate 12.

Note that although only a single OLED 18 is shown here for convenience, the substrate 12 may comprise a plurality of OLEDs 18 arranged in any suitable configuration according to the requirements of a particular transaction card 10. It would also be understood by the skilled person that each of the plurality of OLEDs 18 may be configured to perform a different function within the context of the operation of a particular card design. For this purpose, each OLED may be configured to emit a light of any colour.

In specific embodiments the array of OLEDs may be passively addressed in order to display a two dimensional image. For example, a plurality of OLEDs may be arranged in an array to define an OLED display configured to display the two dimensional image. A plurality of OLEDs may be patterned into the substrate through diffusion in the outer plastic casing of the substrate to form the two dimensional image.

The inductively powered tag is a radio-frequency identification (RFID) tag which is configured to communicate with a corresponding RFID antenna in an external device, such as, for example, a card reader. In alternative embodiments the inductively powered tag is a near field communication (NFC) module configured to communicate with a corresponding NPC antenna of an external device. In this way, the inductively powered tag is able to form a wireless network connection with an external device, when in use.

The RFID tag comprises an antenna that is configured to receive a radio-frequency (RF) signal from an RFID reader. The RF signal is sent by the reader to interrogate the RFID tag when in use. The integrated chip is arranged to modulate and demodulate the interrogation signal and then store and process the data derived therefrom. The antenna is further arranged to transmit a responding signal back to the RFID reader. The integrated chip comprises non-volatile memory for storing the data which is transmitted to and from the RFID tag. Both the interrogation signal and the responder signal may be encoded radio signals. The integrated chip is further arranged to draw current that is induced in the antenna of the RFID tag by the interrogation signal that is incident upon it. In this way the inductively powered tag is arranged to power the operation of the integrated chip, when in use.

The structure of the OLED 18 according to an embodiment of the present invention will now be described with reference to FIG. 1. The OLED 18 includes a plurality of thin layers arranged in a stack that is formed onto the upper face 16 of the substrate 12. During fabrication of the OLED, a bottom electrode is deposited onto the substrate 12, which thereby defines a lower boundary of the OLED. A number of the thin layers form a light-emitting layer that is arranged between the bottom electrode and a top electrode which is deposited on top of the light emitting layer. A second substrate, made from a transparent flexible polymer material, is then arranged above the top electrode such that it defines an upper boundary of the OLED. In this way the substrate 12 is arranged to support the OLED 18 during both its fabrication and operation.

During operation of the OLED 18, the first and second substrates further define a front and back plane of the OLED 18, respectively. The supporting substrates are each configured to be flexible, when in use. The top electrode is configured to exhibit a lower work function than the bottom electrode such that, when in use, a potential difference can be established across the light emitting layer. Thus, the top and bottom electrodes form an anode and a cathode of the OLED, respectively. The top electrode is also configured to be transparent.

During operation the OLED 18 is activated by drawing current from the inductively powered tag. A voltage is thereby applied between the electrode, which causes positive charge carriers (holes) to be injected into the OLED 18 through the anode and negative charge carriers (electrons) to be injected into the OLED through the cathode. The holes and electrons combine in the light-emitting layer to form an exciton which then undergoes radiative decay causing the emission of a photon of light. In alternative embodiments, the OLED structure may be inverted such that top electrode acts as a cathode and the bottom electrode acts as an anode of the OLED. It will appreciated by the skilled person that the above described OLED structure is only one example of a number of different OLED structures that may be used in the transaction card 10.

The transaction module 14 will now be described in more detail with reference to FIG. 2. The transaction module 14 comprises an integrated chip 20, which is connected to an antenna 22 of the inductively powered tag by a first set of electrical connectors 24a, 24b. The integrated chip 20 is further connected to the OLED 18 by a second set of electrical connectors 26a, 26b, which The first and second electrical connectors are arranged such that the antenna 22, the integrated chip 20 and the OLED 18 are connected in parallel with each other.

The integrated chip 20 comprises a processor and a memory, and when powered is adapted to perform the transaction logic of a contactless transaction according to relevant protocols. Typically these will be EMV contactless protocols as described in published EMVCo specifications, which are currently to be found at https://www.emvco.com/ specifications.aspx?id=21. The person skilled in the art will refer to these specifications for implementation of a contactless protocol. The integrated chip 20 will operate as a conventional contactless transaction chip, but will in addition have logic to allow powering of the OLED 18 (or a suitable element of the OLED in the arrangement described below in FIG. 3) at determined stages of the transaction process—for example, when the integrated chip has been powered and a transaction process is under way, or when it has been completed).

During operation, the antenna 22 is configured to receive the interrogation signal from an external device, such as a card reader. The interrogation signal generates an alternating current (AC) in the antenna 22 which is then inverted by the integrated circuit 20 and converted into a direct current (DC). The direct current is used to activate the OLED 18 such that it emits light of a particular illumination intensity.

With conventional contactless payment systems, no signature or personal identification number (PIN) is required in order make a transaction. As a result, contactless payment systems are much quicker than conventional payment systems such as chip and pin payment systems, for example. However, unlike with chip and pin payment systems, the user receives no feedback on whether the transaction has been completed when using a conventional contactless payment.

Each of the above described embodiments are provided with the an OLED 18, which is operable to illuminate under the influence of the inductively powered tag in order to provide feedback to the user of the transaction card 10 relating to a transaction that may have occurred. The feedback may provide an indication that a particular transaction has been completed. Alternatively, the feedback may relate to the authentication of the transaction card and/or the reader with which it is communicating. In embodiments, the OLED 18 is configured to display a one colour whilst a transaction is ongoing and a second colour once the transaction has been completed. The OLED 18 may be configured to show a third colour if the authenticity of the reader and/or the card is invalid.

Figure 2:
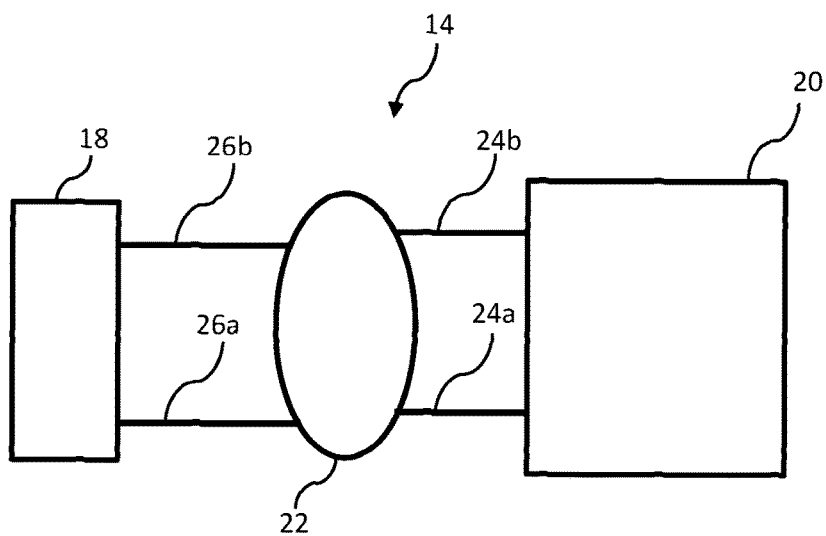
FIG. 2 is a schematic view of the contactless transaction card of FIG. 1 according to an embodiment of the invention.

According to an embodiment of the invention the transaction module 14, as shown in FIG. 2, may be arranged in a high-frequency configuration whereby the antenna 22 is configured to receive high-frequency electromagnetic signals from the card reader The high frequency signals are typically within a range of 3 to 30 MHz. The high-frequency antenna is combined with a rectifying integrated chip which is arranged to provide a constant 0.1 mA current flow to power the OLED 18, such that it emits a light with an irradiance of 250 cd/m2. In particular embodiments, the transaction module 14 may be configured to receive ultra-high frequency signals in the range of 300 MHz to 3 GHz.

According to an alternative embodiment of the invention the transaction module 14 may also be arranged in a low-frequency configuration in which the antenna 22 is configured to receive low-frequency electromagnetic signals from the card reader. The low frequency signals are typically within a range of 120 to 150 KHz. This configuration uses a low-frequency antenna with a rectifying integrated chip which is arranged to provide a constant 5 mA current flow in order to power the OLED 18, such that it emits a light with an irradiance of 250 cd/m2. Unlike in the high-frequency configuration, the low-frequency antenna is connected in series with the integrated chip 20 and the OLED 18. In the low-frequency configuration, the antenna provides a relatively high AC supply to the integrated chip 20. The resulting DC supply may be more than is required to operate the OLED 18, which can cause rapid degradation of the OLED 18 over time. Thus, the low-frequency antenna is connected in series with the integrated chip in order to reduce the DC supply and, thereby, improve the life-time of the OLED 18.

Figure 3:
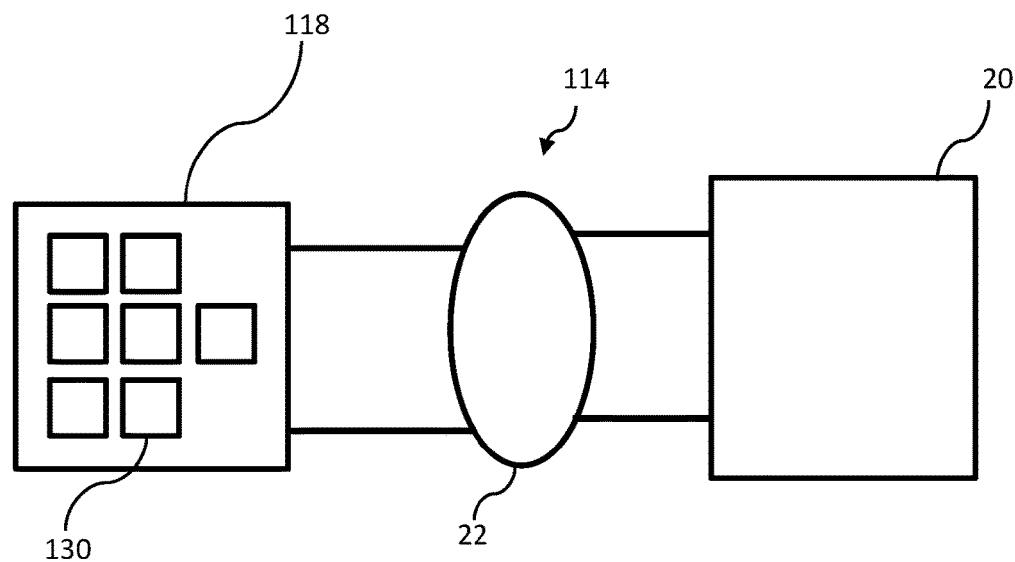
FIG. 3 is a schematic view of the contactless transaction card of FIG. 1 according to an further embodiment of the invention.

With reference to FIG. 3, the transaction module 114 is provided with a configuration in which the OLED 118 comprises seven OLED elements 130, which are arranged in an array, or matrix. The OLED elements 130 constitute separate OLED devices. Each element 130 may be independently connected to the antenna 22 and/or the integrated chip 20 such that it is powered independently from any other element. The elements 130 are arranged to produce a two-dimensional (2D) image that is relevant to the transaction being undertaken by the transaction card 14. Each of the elements 130 may be configured to emit a light of a different colour.

The elements 130 may be formed by patterning a single OLED 118 device through the selective diffusion of the light absorbing compounds into the transparent substrate lying on top of the OLED 118. Thus, the OLED 118 may be configured to produce a 2D image when illuminated. Alternatively, other masking techniques such as would be understood by the skilled person may also be used to define the separate OLED elements 130.

Figure 4:
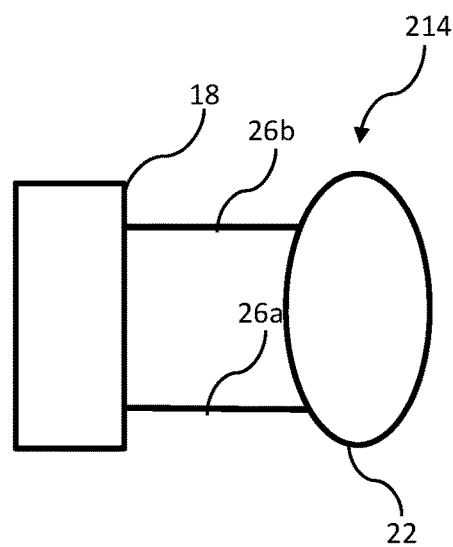
FIG. 4 is a schematic view of the contactless transaction card of FIG. 1 according to a yet further embodiment of the invention.

Turning now to FIG. 4, which shows an alternative low-frequency configuration in which AC power is sent directly from the antenna 22 to the OLED 18 without being modulated by the integrated chip. As with the previously described embodiment, the transaction module 214 is provided with a low-frequency antenna 22, which is connected with the OLED 18 by a set of electrical connectors 26a, 26b. This configuration uses the low-frequency antenna, alone, to provide an alternating current in order to power the OLED 18, such that it emits a light with an irradiance of 350 cd/m2 with a spectral output peak maximum of 565 nm.

A method of manufacturing the transaction device 12 will now be described according to an embodiment of the present invention. In a first step of the method, a blank substrate 12 is run through a dye machine that applies the text and graphic designs for the particular credit card company.

The transaction module 14 is then deposited onto the upper face 16 of the substrate 12. The deposition of the integrated chip, the OLED and the inductively powered tag is configured such that a connection is formed between each of the components when they are formed on the substrate 12.

The method may comprise printing each of the components of the transaction module 14 onto the substrate 12. This includes the integrated chip, the OLED and the inductively powered tag. The method may alternatively comprise evaporating each of the components of the transaction module 14 onto the substrate 12. The components of the transaction module 14 are deposited without using thermal deposition techniques. The method of fabricating the transaction module 14 does not involve the use of metal wiring to form the connections between the individual components of the module. No metal wiring is used to form the antenna of the inductively powered tag.

The OLED 18 comprises a stack of device layers which are deposited via a solution process in which each layer of the device structure is sequentially deposited on top of the substrate 12. All device fabrication and processing steps may be carried out in a dry environment, such as a nitrogen filled glove box, to avoid oxygen and water contamination.

The inductively powered tag can be printed using any suitable ink and requires no thermal deposition or use of metal wire to form the inductively powered tag. This is then combined with a printed OLED in a single fabrication process, including but not exclusively, a sheet-fed or a roll-to-roll process. Advantageously the solution processing of the OLED allows it to be built into the substrate rather than being fabricated separately and then attached to the substrate in a separate fabrication process. Thereby, reducing the complexity and cost of the manufacturing process.

Having deposited the components of the transaction module 14, the substrate 12 is then sandwiched between two laminate sheets, The laminated sheets may contain the magnetic strip and/or a hologram security design. The substrate is then placed into a heated press for up to three minutes to bond the laminated sheets to the substrate 12. Individual transaction information is then programmed into the integrated chip of the transaction module 14. This process also records the unique identifying information for each card printed. Further letters may also be embossed onto each substrate 12. Finally, the substrate is cut into individual cards.

In embodiments, the IC, the inductively powered tag and the OLED light source are fabricated simultaneously. Alternatively, each component of the transaction card may be fabricated separately and/or sequentially. The method of the invention may also include a pick and place procedure.

Embodiments of the method include printing the components of the transaction module 14. The printing techniques used to fabricate the inductively powered tags and associated OLED light source include, but are not limited to, one or more of ink-jet flex printing, slot-die coating, screen printing, ink-jet printing, gravure printing, blade coating techniques and spin coating. Each of the components of the transaction card are deposited using a stepwise solution processing method. The methods and procedures associated with each of these techniques would be clearly understood by a person skilled in the art, for example, the term spin-coating is taken to mean the process by which a coating material is dissolved in solution and then deposited onto a spinning substrate to form a uniform thin film. Although some of the device layers are described as being fabricated using spin-coating and slot-die coating techniques, which are batch processing methods, it would be clear to the skilled person that each of the device layers may be deposited using continuous and semi-continuous fabrication techniques such as ink-jet printing and spray-coating.

Many modifications may be made to the above examples without departing from the scope of the present invention as defined in the accompanying claims. For example, the substrate structure and method of fabrication described herein are embodied in a bank card. It would be clear to the skilled person that these advantageous features could also be embodied within other devices which uses contactless functionality, including e-tickets, access cards, key-fobs, wristbands, security labels and travel documents.

The invention claimed is:

1. A substrate for a contactless transaction card, the substrate comprising an integrated chip (IC) connected to two or more organic light-emitting diodes (OLEDs) and an inductively powered tag, the inductively powered tag being arranged to provide a wireless network connection with an external device and the two or more OLEDs being configured to be activated in dependence on said wireless network connection;
wherein the two or more OLEDs are patterned into the tag through diffusion in the outer plastic casing of the substrate to display a two dimensional image.

2. The substrate of claim 1, wherein the substrate is substantially flexible.

3. The substrate of claim 1, wherein the wireless network connection is operable over at least one of the following frequency ranges:
a low frequency range of about 120 to about 150 KHz,
a high frequency range of about 3 to about 30 MHz, and
an ultra-high frequency range of about 300 MHz to about 3 GHz.

4. The substrate of claim 1, wherein at least one OLED is activated by drawing current from the inductively powered tag.

5. The substrate of claim 4, wherein at least one OLED is configured to flash in coordination with an alternating current that it receives from the inductively powered tag.

6. The substrate of claim 5, wherein at least one OLED is configured to output light with at least one of the following characteristics:
a brightness of about 350 cd/m2, and
a spectral output peak maximum of about 565 nm.

7. The substrate of claim 4, wherein the integrated chip is configured to supply at least one OLED with a direct current which is inverted from an alternative current that is drawn from the inductively powered tag.

8. The substrate of claim 7, wherein at least one OLED is configured to output light with a brightness of about 250 cd/m2.

9. The substrate of claim 1, wherein the two or more OLEDs are arranged in an addressable array to define an OLED display configured to display the two dimensional image.

10. The substrate of claim 1, wherein an additional power source is provided within the substrate to power the tag and/or the at least one OLED.

11. A contactless transaction card comprising a substrate equipped with an integrated chip (IC) according to claim 1, wherein the integrated chip is programmed to perform a contactless transaction.

12. A method of manufacturing a substrate for a contactless transaction card, the method comprising:
depositing an integrated chip (IC), an inductively powered tag and two or more organic light-emitting diodes (OLEDs) onto the substrate;
connecting the IC to the inductively powered tag and the two or more OLEDs;
arranging the inductively powered tag to provide a wireless network connection with an external device; and
configuring the two or more OLEDs to be activated in dependence on said wireless network connection;
wherein the step of depositing the two or more OLEDs comprises patterning the two or more OLEDs into the tag through diffusion in the outer plastic casing of the substrate to display a two dimensional image.

13. The method of claim 12, wherein the inductively powered tag and at least one OLED are deposited together in a single fabrication process.

14. The method of claim 12, wherein the inductively powered tag and at least one OLED are deposited separately and/or sequentially.

15. The method of claim 12, comprising printing the inductively powered tag from any suitable solution without using thermal deposition or metal wiring.

16. The method of claim 12, wherein depositing at least one of the inductively powered tag and the at least one OLED comprises using one or more of ink-jet flex printing, slot-die coating, screen printing, ink-jet printing, gravure printing, blade coating and spin coating.

* * * * *